United States Patent [19]

Dorey et al.

[11] Patent Number: 4,831,304
[45] Date of Patent: May 16, 1989

[54] SENSORS

[75] Inventors: Howard A. Dorey, Surrey, England; Bronislaw J. Suski, Antony, France

[73] Assignee: Schlumberger Electronics (U.K.) Limited, Farnborough, England

[21] Appl. No.: 146,383

[22] Filed: Jan. 21, 1988

[30] Foreign Application Priority Data

Jan. 24, 1987 [GB] United Kingdom ............... 8701556

[51] Int. Cl.⁴ ............................................. H01L 41/08
[52] U.S. Cl. ..................................... 310/311; 73/777; 310/321; 310/323; 310/324
[58] Field of Search ........ 310/311, 334, 328, 321–324; 357/26; 73/777–779; 350/358

[56] References Cited

U.S. PATENT DOCUMENTS

| | | | |
|---|---|---|---|
| 3,145,354 | 8/1964 | Hutson | 310/311 |
| 3,183,359 | 5/1965 | White | 310/311 X |
| 3,185,942 | 5/1965 | White | 310/311 X |
| 3,234,488 | 2/1966 | Fair | 310/311 X |
| 3,513,309 | 5/1970 | Hehemann | 310/311 X |
| 3,714,604 | 1/1973 | Kaliski | 310/311 X |
| 4,524,294 | 6/1985 | Brody | 310/311 |

Primary Examiner—Mark O. Budd
Attorney, Agent, or Firm—Sanford J. Asman

[57] ABSTRACT

A solid sensor, for sensing a physical parameter such as pressure, comprises a resonantly vibratable beam formed across a cavity in a substrate by micro-machining, and arranged such that changes in the parameter vary its resonant frequency. The beam either consists of or has deposited on it a material exhibiting piezo-electric effect, so that vibration of the beam can be excited by using the effect. This is achieved using light, either by forming a photodiode in the substrate in or near the beam, so that illuminating the photodiode causes a voltage to be applied to the beam, or, in the case where the piezo-electric material exhibits surface piezo-electric effect, by directly illuminating the beam.

7 Claims, 1 Drawing Sheet

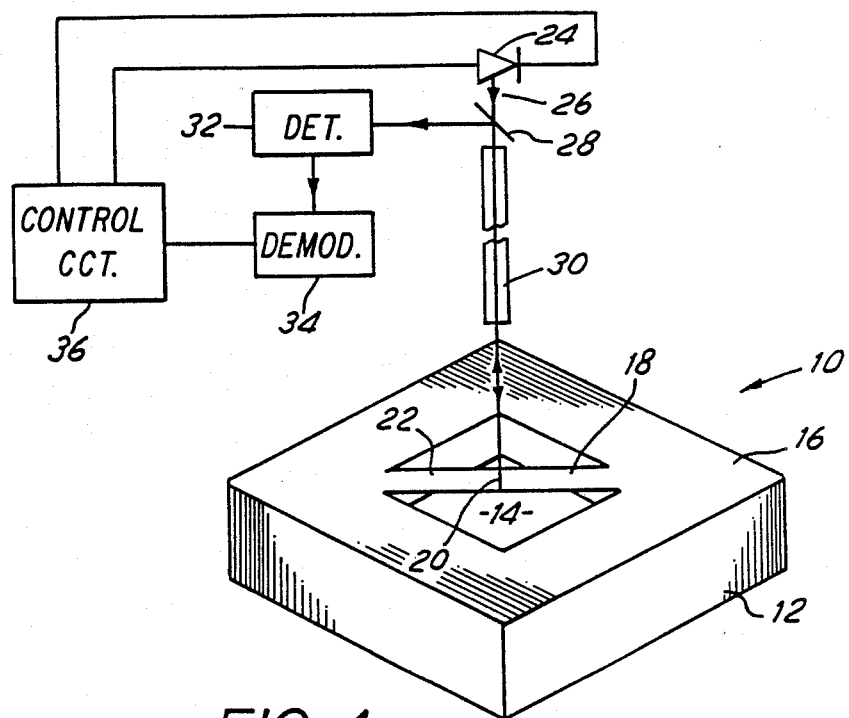
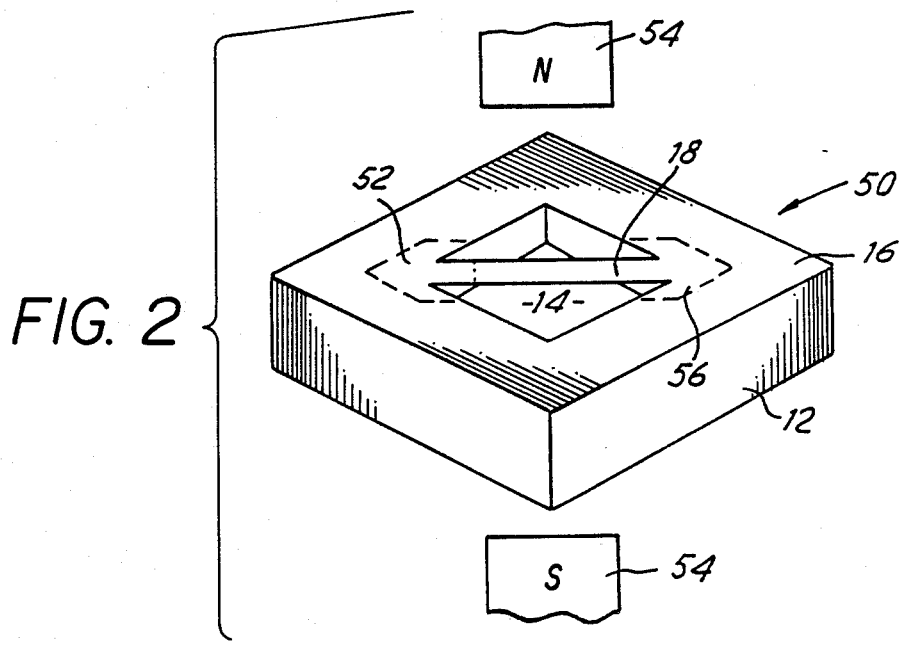

SENSORS

This invention relates to sensors, and is more particularly but not exclusively concerned with sensors in which the parameter to be sensed affects the frequency of a resonantly vibrating element whose resonant vibration is excited and/or sensed optically.

It has already been proposed, in a letter entitled "Optically Activated Vibrations in a Micromachined Silica Structure" by S. Venkatesh and B. Culshaw (Electronics Letters, Apr. 11, 1985, Vol. 21, No. 8), to provide a sensor comprising a microminiature bridge of silicon dioxide, fabricated using anisotropic etch techniques on a silicon substrate. A thin gold film is sputtered onto the bridge, which is then excited into resonant vibration, typically at about 260 KHz, by directing a suitably modulated laser beam onto the centre of the bridge. The frequency of vibration of the bridge is detected using another laser beam. The sensor is arranged such that the parameter to be sensed acts on the substrate so as to vary the resonant frequency of the bridge.

The sensor of this prior proposal suffers from the disadvantage that the characteristics of the sensing element are not very stable or repeatable, firstly because the silicon dioxide material of the sensing element is amorphous and secondly because of the difficulty of producing a uniform and repeatable gold coating on such an amorphous sensing element.

It is therefore an object of the present invention to provide a sensor in which the abovementioned disadvantage is significantly alleviated.

According to one aspect of the present invention, there is provided a sensor comprising a resonantly vibratable element arranged such that its frequency of vibration is a function of a physical parameter, e.g. pressure, force, temperature, to be sensed, characterised in that said element is formed, e.g. by micro-machining, in a substrate of crystalline material exhibiting at least some piezo-electric effect, the substrate having suitable dopants diffused thereinto to form a photo-responsive device which is disposed in or adjacent the element such that illumination of the device applies a voltage to the element, causing it to move by piezo-electric effect.

Because the vibratable element is made in a crystalline material, and since it does not need to be coated with gold, the characteristics of the sensor are more stable and repeatable than those of the sensor of the prior proposal.

In a preferred embodiment of this first aspect of the invention, the movement of the vibratable element is sensed optically, most conveniently by arranging the element in the path of a light beam, typically a laser beam, so that its vibration modulates the beam. Preferably, the sensor also includes illumination means responsive to the modulated beam for illuminating the photo-responsive device so as to maintain the element in resonant vibration.

Advantageously, the photo-responsive device is a photovoltaic photodiode.

According to another aspect of the invention, there is provided a sensor comprising a resonantly vibratable element arranged such that its frequency of vibration is a function of a physical parameter, e.g. pressure, force, temperature, to be sensed, characterized in that said element is formed, e.g. by micro-machining, in a substrate of crystalline material, the substrate having suitable dopants diffused therein to form a semiconductor circuit arranged to cause the flow of a current through the element, e.g. a transistor of which the element forms part of the collector or drain, the sensor further comprising means for subjecting the element to a magnetic field so as to cause it to move.

The characteristics of the sensor are again relatively stable and repeatable, for the reasons mentioned earlier.

In a preferred embodiment of this second aspect of the invention, the movement of the element is detected by a voltage sensor, also formed by diffusion of suitable dopants into the substrate, and the output of the voltage sensor is used to modulate the drain current of the semiconductor circuit so as to maintain the element in resonant vibration.

In either aspect of the invention, the resonantly vibratable element may conveniently comprise a beam extending across a recess in the substrate, and the crystalline material of the substrate may be gallium arsenide, cadmium sulphide, zinc oxide or lithium niobate.

According to yet another aspect of the invention, there is provided a sensor comprising a resonantly vibratable element arranged such that its frequency of vibration is a function of a physical parameter, e.g. pressure, force, temperature, to be sensed, characterised in that said element is formed, e.g. by micro-machining, in a substrate of crystalline material and comprises a material exhibiting surface piezo-electric effect, the sensor further comprising means for directing light of suitable wavelength into the element so as to induce resonant vibration thereof by said surface piezo-electric effect.

The invention will now be described, by way of example only, with reference to the accompanying drawings, of which:

FIG. 1 is a somewhat schematic view of a first embodiment of a sensor in accordance with the invention; and FIG. 2 is an equally schematic view of a second embodiment of a sensor in accordance with the invention.

The sensor shown in FIG. 1 is indicated generally at 10, and comprises a generally rectangular substrate 12 of crystalline gallium arsenide, which has been initially doped by diffusing a suitable dopant thereinto, so that it constitutes P-type semiconductor material. A generally rectangular recess 14 is formed, as will hereinafter be described, in the centre of the upper face 16 of the substrate 12, so as to leave a bridge or beam 18 extending diagonally across the mouth of the recess. In the centre of the beam 18, which is typically 50 to 100 micrometers in length, a photovoltaic PN junction 20 (i.e. a photodiode) is formed by diffusing a suitable dopant into the portion of the beam to one side of the centre, e.g. the portion indicated at 22 in FIG. 1, so that the portion 22 constitutes N-type semiconductor material.

The recess 12 and beam 18 are typically formed by micro-machining, using anisotropic etch techniques. In practice a plurality of sensors 10 are simultaneously formed in a single wafer of the doped substrate material, and then separated by cutting. The diffusion step producing the N-type portions 22 is preferably performed after the micromachining step (but before the separation step).

The sensor 10 also includes means for exciting resonant vibration of the beam 18, comprising a light source 24, indicated for convenience in FIG. 1 as a laser diode, arranged to direct a light beam 26 through a half-silvered mirror 28 and an optical fibre 30 onto the PN junction 20 in the centre of the beam 18. In practice, the end of the optical fibre 28 is extremely close to the PN junction 30, to focus the light beam thereupon: it is shown spaced from the PN junction in FIG. 1 merely for the sake of clarity.

The light incident on the PN junction 30 generates a voltage along the beam 18, typically of the order of 0.1 to 1 volt, which in turn subjects the beam 18 to an electric field of up to about 200 volts/cm. Since the material of the substrate 12 is a piezo-electric material, the beam 18 tries to elongate, but since it is secured at both ends, it flexes instead.

Part of the light beam 26 incident on the beam 18 is reflected back into the optical fibre 30, and the movement of the beam 18 operates to modulate this reflected part (e.g. by Doppler effect or by varying the amplitude of the reflected part, depending on the direction of the movement). The reflected part of the light beam, after traversing the optical fibre 30, is reflected by the half-silvered mirror 28 onto a photo-electric detector 32, whose output is connected to a demodulator circuit 34. The output of the demodulator circuit 34 is connected in turn to an illumination control circuit 36, which controls the energisation of the light source 24.

Thus the light source 24, the beam 18, the detector 32, the demodulator 34 and the control circuit 36 form the principal elements of a closed loop which excites and maintains resonant vibration of the beam 18, by modulating the light source 24 at the resonant frequency of the beam as detected by the detector 32.

To use the sensor 10, the parameter to be sensed is arranged to act on the substrate 12 so as to change the forces acting on the beam 18, thus changing its resonant frequency. This can be achieved in several ways. For example, if the parameter is pressure, the substrate 12 can be bonded to a diaphragm which is arranged to be subjected to the pressure: changes in the pressure acting on the diaphragm cause it to flex, so changing the strain applied via the substrate 12 to the beam 18. Similarly, if the parameter is either force or displacement, the substrate 12 can be bonded to a flexible member arranged to be flexed by the force or displacement.

It will be appreciated that the sensor 10 is extremely small and rugged, and is relatively simple and inexpensive to manufacture using known semiconductor manufacturing techniques. Additionally, it provides an output, from the demodulator 34, in the form of a frequency related to the parameter being sensed, which output is inherently compatible with the digital processing circuitry frequently used to process the outputs of such sensors.

Many modifications can be made to the sensor 10.

For example, the PN junction 20 can be formed at or adjacent one end of the beam 18 (instead of in the middle), as long as it is positioned and can be illuminated so as to apply the resulting voltage along the beam 18. In this case, separate light beams are used for illuminating the PN junction and sensing the movement of the beam: indeed, separate light beams can be used in the case of the sensor 10 if desired. Further, the resonantly vibratable beam 18 can be replaced by any other resonantly vibratable element, for example a cantilever or diaphragm, which can be produced by micro-machining. Also, suitable piezo-electric materials other than gallium arsenide can be used for the substrate 12, for example cadmium sulphide, zinc oxide or lithium niobate.

It will be appreciated that the piezo-electric properties of the piezo-electric materials mentioned above are anisotropic, so that care needs to be taken with crystal orientation to ensure that the orientation requirements necessary to permit the anisotropic etching used for micro-machining do not unduly conflict with the ability to achieve a useful piezo-electric effect in the finished sensor. In the event there is such a conflict, then micro-machining based on isotropic etching can be used instead of anisotropic etching, but this is more difficult and less controllable, and therefore to be avoided where possible.

Another modification which can be made to the sensor 10, where the material used for the substrate is zinc oxide, cadmium sulphide or gallium arsenide, involves omitting the PN junction 20 altogether. This can be done because these three materials all exhibit surface piezo-electric effect, which can be directly stimulated by light of suitable wavelength, for example in the ultra violet band (or even shorter wavelengths). Thus vibration of the beam 18 can be directly excited, by illuminating it with light modulated at the resonant frequency of the beam, as part of a closed loop of the kind described in relation to the sensor 10.

Yet another modification which can be made to the sensor 10, again making use of surface piezo-electric effect, involves using silicon for the substrate 12. The PN junction 20 is again omitted, and zinc oxide is deposited on the surface of the beam 18 by sputtering. This is a well established process by which relatively consistent and repeatable results can be achieved: and again, vibration of the beam 18 can be directly excited by illuminating the zinc oxide deposited thereon with suitably modulated light, as described in the preceding paragraph.

The sensor shown in FIG. 2 is indicated generally at 50, and possesses a number of features in common with the sensor 10 of FIG. 1. These common features have therefore been given the same reference numbers as were used in FIG. 1.

Thus the sensor 50 comprises a substrate 12, a recess 14 and a beam 18 extending across the recess, generally similar to those of FIG. 1. However, the crystalline material of the substrate 12 does not need to be piezo-electric, but merely capable of having suitable dopants diffused into it to form semiconductors, e.g. silicon: however, gallium arsenide can also be used if desired. Such dopants are indeed diffused into the substrate 12, at and adjacent the left hand end of the beam 18 (as viewed in FIG. 2), so as to form a transistor 52 of which the beam 18 forms part of the collector or drain.

Resonant vibration of the beam 18 is excited and maintained by placing the beam in the field of a permanent magnet shown diagrammatically at 54, such that the magnetic field is transverse to (and preferably perpendicular to) the longitudinal axis of the beam.

A simple semiconductor voltage detector is diffused into the substrate 12 adjacent the other end of the beam, as indicated diagrammatically at 56, and arranged to sense the voltage across the beam. The output of the voltage detector 56 is applied to the base or gate of the transistor 52, so as to vary the current flowing through the beam. The beam 18, the detector 56 and the transistor 52 therefore form a closed loop operating to produce an alternating current in the beam 18, and the interaction of this current and the magnetic field causes the beam to vibrate resonantly.

The output of the sensor 50 is again a frequency, i.e. the frequency of the signal at the output of the voltage detector 56.

The low power required for the operation of the closed loop based on the beam 18, the voltage detector 56 and the transistor 52 is supplied to the sensor 50 optically, by illuminating one or more photodiodes (not shown) diffused into the substrate 12 as described in relation to FIG. 1. The interconnections between the voltage detector 56, the transistor 52 and their power supply are made by conductive tracks (not shown) formed on the surface of the substrate 12 by conventional integrated circuit techniques, although care must be taken to ensure that the metallisation layer from which the tracks are formed does not cover the region in which the beam 18 is formed.

The parameter to be sensed can be applied to the sensor 50 in any of the ways discussed in relation to the sensor 10 of FIG. 1.

The sensor 50 clearly possesses the same advantages as the sensor 10 of FIG. 1, and several of the possible modifications of the sensor 10 are also applicable to the sensor 50. Additionally, the resonant vibration of the beam 18 of the sensor 50 can be sensed optically as described in relation to the sensor 10, enabling the sensor 50 to be completely electrically isolated.

We claim:

1. A sensor for sensing a physical parameter, the sensor comprising:
   a resonantly vibratable element, formed in a substrate;
   means for exciting resonant vibration of the element; and
   means for applying the parameter to the element so as to vary the frequency of vibration thereof in dependence upon the parameter;
   wherein the element comprises a material which exhibits surface piezo-electric effect; and
   the exciting means includes means for directing light of suitable wavelength onto the element so as to induce said resonant vibration thereof by virtue of said surface piezo-electric effect.

2. A sensor as claimed in claim 1, wherein the element is formed in a substrate of crystalline material which exhibits said surface piezo-electric effect.

3. A sensor as claimed in claim 2, wherein said material is selected from the group comprising zinc oxide, cadmium sulphide and gallium arsenide.

4. A sensor as claimed in claim 1, wherein the element is formed in a silicon substrate, and said material is sputtered onto said element.

5. A sensor as claimed in claim 4, wherein said material is zinc oxide.

6. A sensor as claimed claim 1, wherein the resonantly vibratable element comprises a beam extending across a recess in the substrate.

7. A sensor as claimed in claim 1, wherein the resonantly vibratable element is formed by micro-machining.

* * * * *